(12) United States Patent
Sedlack et al.

(10) Patent No.: US 9,760,713 B1
(45) Date of Patent: Sep. 12, 2017

(54) SYSTEM AND METHOD FOR CONTENT-INDEPENDENT DETERMINATION OF FILE-SYSTEM-OBJECT RISK OF EXPOSURE

(71) Applicant: Dell Software Inc., Aliso Viejo, CA (US)

(72) Inventors: Timothy Charles Sedlack, Issaquah, WA (US); Leslie G. Wardwell, Avondale, AZ (US)

(73) Assignee: Dell Software Inc., Aliso Viejo, CA (US)

( * ) Notice: Subject to any disclaimer, the term of this patent is extended or adjusted under 35 U.S.C. 154(b) by 0 days.

(21) Appl. No.: 14/191,648

(22) Filed: Feb. 27, 2014

(51) Int. Cl.
G06F 21/55 (2013.01)
G06F 21/57 (2013.01)

(52) U.S. Cl.
CPC .......... *G06F 21/552* (2013.01); *G06F 21/554* (2013.01); *G06F 21/577* (2013.01)

(58) Field of Classification Search
CPC ............................. G06F 21/552; G06F 21/554
See application file for complete search history.

(56) References Cited

U.S. PATENT DOCUMENTS

| | | | | |
|---|---|---|---|---|
| 6,711,687 | B1 * | 3/2004 | Sekiguchi | 726/23 |
| 7,668,953 | B1 * | 2/2010 | Sinclair et al. | 709/224 |
| 7,818,801 | B2 | 10/2010 | Small | |
| 7,895,650 | B1 * | 2/2011 | Sobel | 726/22 |
| 7,979,494 | B1 | 7/2011 | Golovin et al. | |
| 8,001,603 | B1 * | 8/2011 | Kennedy | G06F 21/563 713/165 |
| 8,140,898 | B2 * | 3/2012 | Beg et al. | 714/26 |
| 8,161,323 | B2 * | 4/2012 | Kuchibhotla et al. | 714/25 |
| 8,171,343 | B2 * | 5/2012 | Beg et al. | 714/37 |
| 8,417,656 | B2 * | 4/2013 | Beg et al. | 706/45 |
| 8,516,597 | B1 * | 8/2013 | Sharma | G06F 21/577 705/38 |
| 8,601,539 | B1 | 12/2013 | Bobel | |
| 8,612,377 | B2 * | 12/2013 | Beg et al. | 706/52 |
| 8,677,448 | B1 * | 3/2014 | Kauffman | G06F 17/30082 726/1 |
| 8,978,151 | B1 * | 3/2015 | Chamberlain | 726/26 |
| 2002/0065841 | A1 * | 5/2002 | Matsuda et al. | 707/206 |

(Continued)

OTHER PUBLICATIONS

Nepal, Surya; Friedrich, Carsten; Henry, Leakha; Chen, Shiping; "A Secure Storage Service in the Hybrid Cloud", Fourth IEEE International Conference on Utility and Cloud Computing (UCC), Dec. 5-8, 2011, pp. 334-335.*

(Continued)

*Primary Examiner* — Victor Lesniewski
(74) *Attorney, Agent, or Firm* — Winstead PC

(57) ABSTRACT

In one embodiment, a method is performed by a computer system comprising computer hardware. The method includes monitoring a file system for risk-assessment events. The method further includes, responsive to a real-time determination of at least one risk-assessment event, determining a content-independent risk of exposure for a file-system object associated with the risk-assessment event. The determining of the content-independent risk of exposure is based, at least in part, on a depth of the file-system object in the file system and a set of users who can access the file-system object.

17 Claims, 3 Drawing Sheets

(56) References Cited

U.S. PATENT DOCUMENTS

| | | | |
|---|---|---|---|
| 2007/0101433 A1* | 5/2007 | Louch et al. | 726/25 |
| 2007/0103984 A1* | 5/2007 | Kavuri et al. | 365/185.17 |
| 2008/0250060 A1* | 10/2008 | Grois | 707/102 |
| 2009/0222415 A1* | 9/2009 | Mimatsu | G06F 21/62 |
| 2009/0313246 A1* | 12/2009 | Saito | 707/5 |
| 2010/0121916 A1* | 5/2010 | Lin | 709/203 |
| 2010/0125911 A1* | 5/2010 | Bhaskaran | 726/23 |
| 2010/0138922 A1* | 6/2010 | Zaifman et al. | 726/23 |
| 2010/0154056 A1* | 6/2010 | Smith et al. | 726/22 |
| 2010/0162347 A1* | 6/2010 | Barile | 726/1 |
| 2011/0083180 A1* | 4/2011 | Mashevsky | G06F 21/55 |
| | | | 726/23 |
| 2011/0231361 A1 | 9/2011 | Patchava et al. | |
| 2011/0239306 A1* | 9/2011 | Avni | G06F 21/54 |
| | | | 726/26 |
| 2011/0270809 A1 | 11/2011 | Dinkar et al. | |
| 2011/0307957 A1* | 12/2011 | Barcelo | G06F 21/552 |
| | | | 726/25 |
| 2012/0151397 A1* | 6/2012 | Oberstein et al. | 715/769 |
| 2012/0210388 A1* | 8/2012 | Kolishchak | 726/1 |
| 2013/0097701 A1* | 4/2013 | Moyle | G06F 21/552 |
| | | | 726/22 |
| 2013/0097709 A1* | 4/2013 | Basavapatna et al. | 726/25 |
| 2013/0268994 A1* | 10/2013 | Cooper | H04L 63/10 |
| | | | 726/1 |
| 2014/0196104 A1* | 7/2014 | Chari | H04L 63/102 |
| | | | 726/1 |
| 2014/0201806 A1* | 7/2014 | Kumar | 726/1 |
| 2014/0259190 A1* | 9/2014 | Kiang et al. | 726/30 |
| 2015/0128262 A1* | 5/2015 | Glew | G06F 21/554 |
| | | | 726/23 |
| 2015/0205954 A1* | 7/2015 | Jou | G06F 21/316 |
| | | | 726/22 |
| 2015/0242623 A1* | 8/2015 | Lindo | G06F 21/554 |
| | | | 726/23 |

OTHER PUBLICATIONS

Meling, Jon; Lilleby, Bjornstein; Levlin, Paul; Sonvisen, Tor Erik; Johansen, Stig; Johansen, Dag; Kvalnes, Age; "Gohcci: Protecting sensitive data on stolen or misplaced mobile devices", Tenth International Conference on Mobile Data Management: Systems, Services and Middleware, May 18-20, 2009, pp. 348-354.*

Dark Reading, "Dark Reading Must Reads: Risk Management: A Compendium of our Best Recent Coverage," Oct. 2013, 25 pages.

* cited by examiner

SYSTEM AND METHOD FOR CONTENT-INDEPENDENT DETERMINATION OF FILE-SYSTEM-OBJECT RISK OF EXPOSURE

BACKGROUND

Technical Field

The present invention relates generally to data analysis and more particularly, but not by way of limitation, to systems and methods for content-independent determination of file-system-object risk of exposure.

History of Related Art

Data breaches are prevalent. To prevent data breaches, electronic data is often categorized using, for example, operational procedures and processes, as sensitive (e.g., confidential or compliance-related). Sensitive electronic data is typically segregated in a given file system. Permissions may also be assigned. In other words, electronic data having certain content categorizations may be treated in a way that is supposed to be more secure. However, organizations are not typically able to perform analysis regarding, for example, what electronic data is actually at risk of being exposed to an unintended audience.

Moreover, as the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In one embodiment, a method is performed by a computer system comprising computer hardware. The method includes monitoring a file system for risk-assessment events. The method further includes, responsive to a real-time determination of at least one risk-assessment event, determining a content-independent risk of exposure for a file-system object associated with the risk-assessment event. The determining of the content-independent risk of exposure is based, at least in part, on a depth of the file-system object in the file system and a set of users who can access the file-system object.

In one embodiment, an information handling system includes a processing unit, wherein the processing unit is operable to implement a method. The method includes monitoring a file system for risk-assessment events. The method further includes, responsive to a real-time determination of at least one risk-assessment event, determining a content-independent risk of exposure for a file-system object associated with the risk-assessment event. The determining of the content-independent risk of exposure is based, at least in part, on a depth of the file-system object in the file system and a set of users who can access the file-system object.

In one embodiment, a computer-program product includes a non-transitory computer-usable medium having computer-readable program code embodied therein. The computer-readable program code is adapted to be executed to implement a method. The method includes monitoring a file system for risk-assessment events. The method further includes, responsive to a real-time determination of at least one risk-assessment event, determining a content-independent risk of exposure for a file-system object associated with the risk-assessment event. The determining of the content-independent risk of exposure is based, at least in part, on a depth of the file-system object in the file system and a set of users who can access the file-system object.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION OF ILLUSTRATIVE EMBODIMENTS OF THE INVENTION

Figure 1:
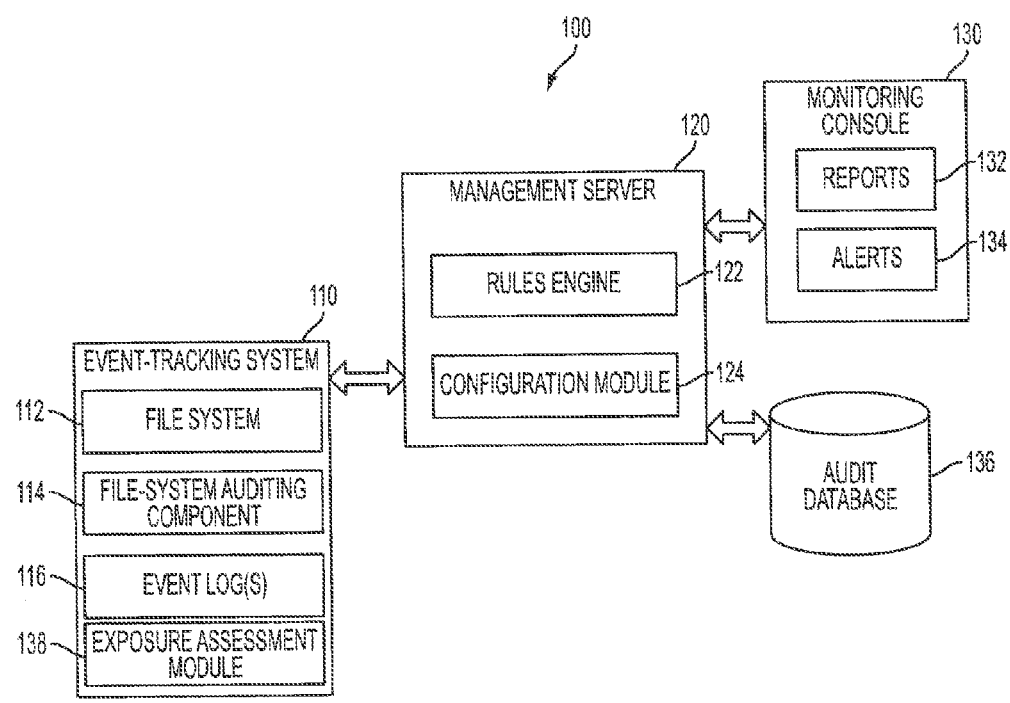
FIG. 1 illustrates an example of a system for monitoring a file-system environment.

In various embodiments, a file-system-object risk of exposure can be determined in a content-independent fashion. In particular, the file-system-object risk of exposure can be determined via analysis of content-independent factors such as, for example, security settings such as permissions, a depth of a file-system object in a file system, detected accesses to a file-system object and/or the like.

In the context of computer operating systems, a file may be defined as a named collection of data. Files are normally retained in storage devices. A file system is that portion of an operating system whose primary task is to manage the files retained on one or more storage devices. In general, the file system is the means through which all files are manipulated (e.g., created, destroyed and modified). To aid in this task, file systems retain and/or obtain information about each file, so called "metadata." Illustrative file metadata include the file's user-specified name, a file identifier (for uniquely identifying the file to the file system), a pointer or reference to the file in non-volatile storage (or main memory), the user ID associated with the file's creation, the time at which the file was created, the user ID associated with the last modification to the file, the time the last modification to the file was made and security information. Illustrative security information includes which specified users or user groups (e.g., administrator, employees and executives) are permitted to read or modify the file. It will be recognized that some, or all, of this metadata may be retained within the file itself. For purposes of this patent application, a file-system object can encompass a file, group of files, a directory, a folder, and/or the like. For purposes of this patent application, file-system-object risk of exposure refers to a measurement of whether a file-system object is available to a potentially unwanted audience.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

FIG. 1 illustrates an example of a system 100 for monitoring a file-system environment. In general, the system 100 is configured to provide for real-time security auditing and/or reporting on activity in the file-system environment. For example, the file-system environment can comprise a Microsoft Windows® environment, a Linux environment, a UNIX environment, and/or the like.

As shown in FIG. 1, the system 100 can include a file-event tracking system 110 that is in communication with a management server 120. The management server 120 is further in communication with a monitoring console 130. In general, the management server 120 coordinates real-time monitoring and/or reporting of activity on the file-event tracking system 110. As discussed in more detail below, the monitoring console 130 provides for user interaction with the management server 120. In certain embodiments, the file-event tracking system 110 can include a single information handling system (e.g., a single computer or server) or can be distributed among multiple information handling systems (e.g., multiple servers coupled through a network).

The file-event tracking system 110 can further include a file system 112, a file-system auditing component 114, and an exposure-assessment module 138. The file-system auditing component 114 is shown to reside on the file-event tracking system 110. In certain embodiments, the file-system auditing component 114 can include hardware/software modules and/or subcomponents for real-time monitoring or auditing of the file system 112. For example, the file-system auditing component 114 can be configured to monitor user file-system activity. Types of file-system activity that may be specified by a user include directory and file operations such as create, delete, move, rename, security change (e.g. a change to permissions), access denied while creating, access denied while opening actions, etc.

In certain embodiments, an administrator or other user may specify that one or more of these file system actions be tracked on a per-file, per-directory, per-user group, per-process, and/or per-user identification basis. In addition, all of one or more specified file-system activities may also be tracked (regardless of file, directory, group, process or user identification). File-system activities that are tracked may be considered file-system events. In various embodiments, file-system-event specification can be obtained from a user (e.g., a system administrator) though a graphical user interface ("GUI"). In certain embodiments, the data obtained by the file-system auditing component 114 can be used as audit data and/or to identify potential security breaches or threats in the file-event tracking system 110.

It will be appreciated that, in other embodiments, the file-system auditing component 114 can at least partially reside on a remote system such as the management server 120. For instance, the file-system auditing component 114 can be in the form of various modules. As can be appreciated by one of ordinary skill in the art, each of the modules can comprise various sub-routines, procedures, definitional statements, and/or macros. Moreover, individual modules can be compiled and linked into an executable program, installed in a dynamic link library, or may be written in an interpretive language. It will be appreciated that software modules can be callable from other modules or from themselves, and/or may be invoked in response to detected events or interrupts.

In certain embodiments, the file-system auditing component 114 is operable to initiate the exposure-assessment module 138 upon all or certain file-system events. For example, each time a file-system event is detected (or for certain file-system events), the exposure-assessment module 138 can determine a file-system-object risk of exposure for one or more file-system objects to which the file-system event is deemed applicable. File-system events that trigger determination of a file-system-object risk of exposure may be referred to herein as risk-assessment events. For a given file-system object, the file-system-object risk of exposure can be determined through analysis of content-independent factors such as, for example, a depth of the file-system object in the file system 112, an age of the file-system object, a nature of a particular file-system event, and/or the like. Examples of determining the file-system-object risk of exposure will be described in greater detail below.

For illustrative purposes, the exposure-assessment module 138 is shown to be resident on the file-event tracking system 110. However, it should be appreciated that, in various other embodiments, the file-event tracking system 110 can reside on the management server 120 or on another network node in communication with the system 100. In addition, in some embodiments, the exposure-assessment module 138 can be a sub-module of the file-system auditing component 114.

In certain embodiments, the file-system auditing component 114 is further configured to generate one or more event logs 116 that include information captured, detected or otherwise generated in real time by the file-event tracking system 110. For instance, the event log(s) 116 can include information on file-system events as described above. In addition, the event log(s) 116 can include information related to the determined file-system-object risk of exposure. For example, for each risk-assessment event, the event log(s) 116 can include information related to the determined file-system-object risk of exposure (e.g., a score, metric, or risk classification), information related to a previously determined file-system-object risk of exposure (e.g., a score, metric, or risk classification), a computed change from any previously determined file-system-object risk of exposure, and/or the like. In some embodiments, information related to file-system-object risk of exposure can be included in a separate one of the event log(s) 116.

Although the event log(s) 116 are shown as being stored on the file-event tracking system 110, it will also be understood that the event log(s) 116 can be stored with the file-system auditing component 114 or remote to the file-event tracking system 110. In certain embodiments, the event log(s) are encrypted, write-protected or otherwise maintained to prevent modification of information therein by users, administrators or other personnel with privileged or super access rights.

The file-system auditing component 114, in certain implementations, outputs data obtained from or concerning the file system 112 to the management server 120 for storage and/or analysis. For instance, data from the event log(s) 116 may be evaluated and/or sent to the management server 120. In certain embodiments, the file-system auditing component 114 encrypts this data prior to transmission to the management server 120. The data can be stored, for instance, in an audit database 136, such as a SQL server.

The management server 120 further comprises a rules engine 122. In certain embodiments, the rules engine 122 is configured to analyze the data either as it is received (e.g., streamed) directly from the file-system auditing component 114 or after retrieving the data from the audit database 136. In certain embodiments, the rules engine 122 includes user-defined business rules, policies, metrics, sites, data sources, configuration objects, real-time monitoring rules, combinations of the same, and/or the like. For instance, the rules engine 122 can be used to determine when a report and/or alert needs to be sent to the monitoring console 130 based on information gathered by the file-system auditing component 114 and/or the exposure-assessment module 138. For example, the rules engine 122 can determine whether, given a file-system-object risk of exposure determined by the exposure-assessment module 138, one or more alerts should be sent. The rules engine 122 can further specify to whom the one or more alerts should be sent and how the one or more alerts should be delivered.

The illustrated management server 120 further comprises a configuration module 124. In certain embodiments, the configuration module 124 receives user input regarding settings for the monitoring and/or auditing of the file system 112. In certain embodiments, the configuration module 124 communicates with a computer operated by information technology (IT) personnel, an administrator, a security officer, a compliance officer or auditor, or the like.

For instance, the configuration module 124 can interact with a user interface to manage reporting tasks and/or real-time alerting by the management server 120. In certain embodiments, reporting tasks can include storing audit data in repositories, importing necessary data to audit databases and/or building reports based on the data. Real-time alerting can include, for instance, creating alerts when particular events are detected and/or when certain thresholds for file-system-object risk of exposure are reached. For example, in various embodiments, the configuration module 124 can allow a user or administrator to configure a risk-exposure severity at which alerts should be generated (e.g., risk-exposure severity that is deemed low, medium, high, etc.). Real-time alerting can also include, for example, storing the alerts in a database and/or immediately issuing notifications. In certain embodiments, the configuration module 124 can be further adapted for obtaining and/or analyzing data stored in the audit database 136, modifying rules in the rules engine 122, combinations of the same, and/or the like.

In certain embodiments, the configuration module 124 can be configured to communicate with the monitoring console 130 to obtain user input regarding the auditing of file system data. In certain embodiments, a user may use the configuration module 124 to specify that one or more file system events be tracked on a per-file, per-directory, per-user group, per-process, and/or per-user identification basis. In addition, all of one or more specified event types may also be tracked (regardless of file, directory, group, process or user identification). In various embodiments, a user can use the configuration module 124 to specify risk-assessment events that should trigger determination of a file-system-object risk of exposure. A user can also specify a scope of the file-risk-of-exposure determination. For example, the user can specify, for a given risk-assessment event, a file-system object for which file-system-object risk of exposure should be determined. The specified file-system object can be, for example, a particular file to which the given file-system event relates, a higher-level file-system object such as a folder or directory, a group of files, etc.

The monitoring console 130 advantageously provides an interface for communicating to a user one or more results of the monitoring process. In certain embodiments, the monitoring console 130 comprises a web-based application for working with real-time monitoring alerts. For instance, the application may track the progress of alert resolution and/or include tools for customizing the user interface display.

As illustrated in FIG. 1, the monitoring console 130 further comprises reports 132 and alerts 134. In certain embodiments, the alerts 134 comprise real-time notification of events of interest, such as for example, via email, a text message, a pop-up window, instant message, combinations of the same or the like. The reports 132, in certain embodiments, comprise an analysis tool, such as a log or list of the events of interest, that may be later accessed and evaluated. Moreover, in certain embodiments, the monitoring console 130 can be configured to maintain user profiles such that users can view only the alerts and/or reports they need and/or have permission to access.

An example of determining a file-system-object risk of exposure will now be described. Equation 1 below provides an example of how a file-system-object risk of exposure can be computed. As shown, a file-system-object risk of exposure (R) can be computed as a function of file-system-object risk-of-exposure variables that include a file-system-object age (A), user-access count ($U_C$), a group-access count ($G_C$), and a file-system-node variable ($F_N$).

$$R = A + U_C + (2G_C) + F_N \qquad \text{Equation 1}$$

For a given file-system object, the file-system-object age (A) can refer to a creation date of the file-system object, time elapsed since the creation date, and/or the like. In some embodiments, the file-system-object age (A) can be expressed in UNIX time, for example, as a time elapsed between Jan. 1, 1970 and the creation date. In some embodiments, a weighting factor can be applied so that certain time periods are given greater consideration than others in the computation of the file-system-object age (A). For example, if desired, time elapsed between Jan. 1, 1990 and a current date/time could be weighted more heavily than time elapsed from Jan. 1, 1970 to Jan. 1, 1990.

The user-access count ($U_C$) can refer to a number of individual users who have permission to access the file-system object. In similar fashion, the group-access count ($G_C$) can refer to a number of user groups that have permission to access the file-system object. In certain embodiments, the user-access count ($U_C$) and the group-access count ($G_C$) can each be expressed as raw numbers.

The file-system-node variable ($F_N$) can be representative of a depth of the file-system object within a file system such as the file system 112. In various embodiments, the file-system-node variable ($F_N$) can have an initial value of zero and be adjusted upon the existence of certain node factors. For example, Table 1 below lists examples of node factors and corresponding adjustments to the file-system-node variable ($F_N$), where a depth of one represents a root level of a file system such as the file system 112.

TABLE 1

| NODE FACTOR | ADJUSTMENT TO $F_N$ |
|---|---|
| The file-system object is on a shared drive that can be remotely accessed from another computer. | Increase by Two (2) |
| The file-system object is at a depth of one to three folder levels. | Increase by One (1) |
| The file-system object is at a depth of four to six folder levels. | No Adjustment |
| The file-system object is at a depth of greater than six folder levels. | Decrease by One (1) |

In various embodiments, the file-system-object risk of exposure (R) can be scaled such that certain values are associated with certain risk-severity levels such as, for example, low, moderate, severe, etc. In the embodiment depicted by Equation 1, a higher value for the file-system-object risk of exposure (R) may indicate greater risk of exposure. In other embodiments, a lower value for the file-system-object risk of exposure (R) may indicate greater risk of exposure.

As described above, in some cases a file-system object can include, for example, more than one file and/or folder. In such cases, more than one value for the file-system-object risk-of-exposure variables described above may be available. For example, each file can have its own file age, user-access count, group-access count, and file-system-node variable. In these cases, the respective file-system-object risk-of-exposure variables can be represented by a riskiest value (e.g., oldest age, highest user-access count, highest group-access count, and highest file-system-node value), a median value, a mean value, a modal value, a sum of available values, and/or the like.

Table 2 lists additional examples of file-system-object risk-of-exposure variables. In various embodiments, variables such as those listed in Table 2 can be added to an equation such as Equation 1. Additional examples of file-system-object risk-of-exposure variables will be apparent to one of ordinary skill in the art after reviewing the inventive principles contained herein.

TABLE 2

ADDITIONAL EXAMPLES
OF FILE-SYSTEM-OBJECT
RISK-OF-EXPOSURE VARIABLES

Age of permissions (e.g, oldest age, average age, etc.)
Number of write accesses to a file-system object
Number of read accesses to a file-system object
Number of changes to user permissions over a certain period of time
Number of changes to user-group permissions over a certain period of time
Number of file-creation events (e.g.., when a file-system object is a folder or directory)
Number of Explicit Individual-User Accesses (e.g., including read and write accesses)

TABLE 2-continued

ADDITIONAL EXAMPLES
OF FILE-SYSTEM-OBJECT
RISK-OF-EXPOSURE VARIABLES

Number of inherited or Group Accesses (e.g., including read and write accesses)

Figure 2:
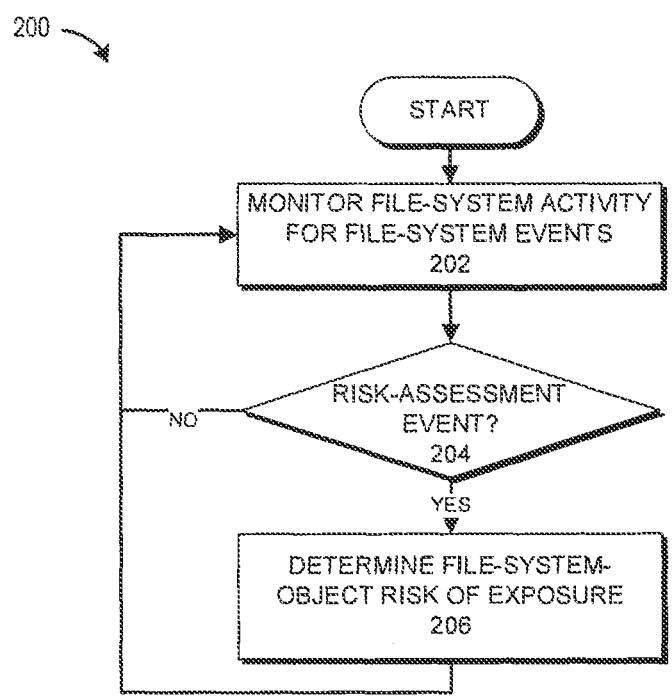
FIG. 2 illustrates an example of a process for determining a file-system-object risk of exposure.

FIG. 2 illustrates an example of a process 200 for determining a file-system-object risk of exposure. For example, the process 200, in whole or in part, can be implemented by one or more of the file system 112, the file-system auditing component 114, the exposure-assessment module 138, the rules engine 122, the configuration module 124, and/or the monitoring console 130. The process 200 can also be performed generally by the file-event tracking system 110, the management server 120, and/or the system 100. Although any number of systems, in whole or in part, can implement the process 200, to simplify discussion, the process 200 will be described in relation to specific systems or subsystems of the system 100.

At block 202, the file-system auditing component 114 monitors file-system activity for file-system events as described with respect to FIG. 1. At decision block 204, it is determined whether a risk-assessment event has occurred. If not, the process 200 returns to block 202. If it is determined at the decision block 204 that a risk-assessment event has occurred, the process 200 proceeds to block 206. At block 206, the exposure-assessment module 138 determines a file-system-object risk of exposure. For example, the file-system-object risk of exposure can be determined for a file-system object that is associated with the risk-assessment event. The file-system-object risk of exposure can be determined, for example, as described above with respect to Equation 1.

Figure 3:
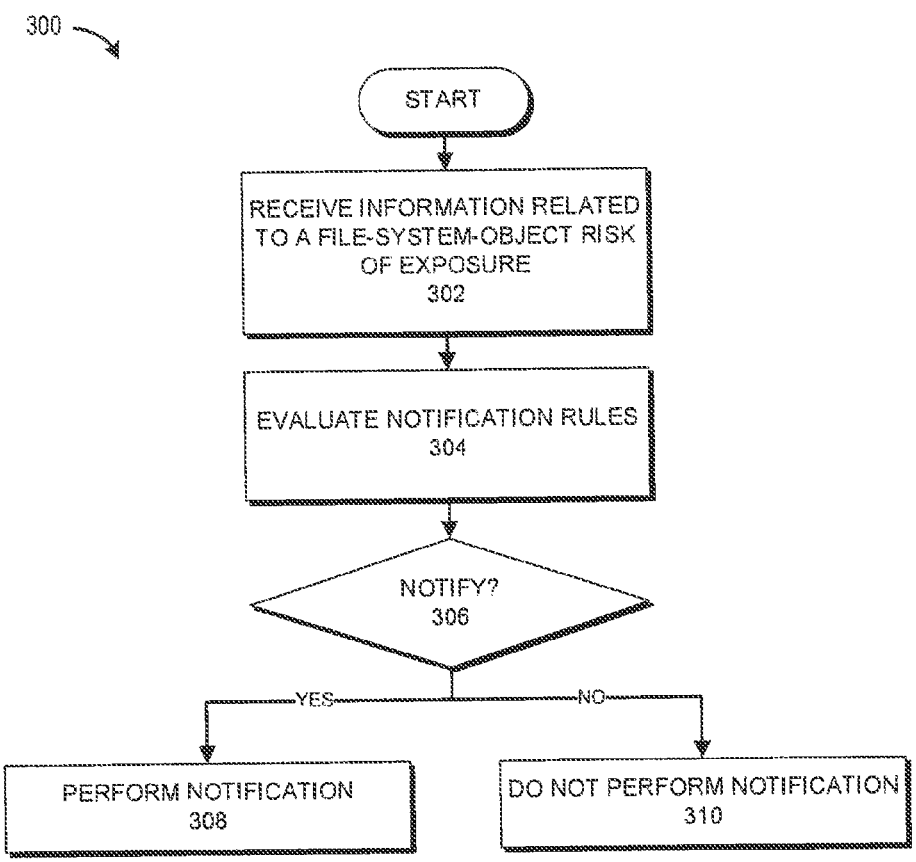
FIG. 3 illustrates an example of a process for notifying one or more users of a determined file risk of exposure.

FIG. 3 illustrates an example of a process 300 for notifying one or more users of a determined file risk of exposure. For example, the process 300, in whole or in part, can be implemented by one or more of the file system 112, the file-system auditing component 114, the exposure-assessment module 138, the rules engine 122, the configuration module 124, and/or the monitoring console 130. The process 300 can also be performed generally by the file-event tracking system 110, the management server 120, and/or the system 100. Although any number of systems, in whole or in part, can implement the process 300, to simplify discussion, the process 300 will be described in relation to specific systems or subsystems of the system 100.

At block 302, the management server 120 receives information related to a file-system-object risk of exposure. In certain embodiments, the file-system-object risk of exposure may have been determined as described with respect to the process 200 of FIG. 2.

At block 304, the management server 120 evaluates the file-system-object risk of exposure against rules of the rules engine 122. For example, in certain embodiments, the rules engine 122 can specify that specific notifications should occur if the file-system-object risk of exposure has reached a certain threshold value (e.g., greater than a certain threshold value, less than a certain threshold value, etc.), has changed relative to a previously determined file-system-object risk of exposure, has changed at least a predefined amount relative to a previously determined file-system-object risk of exposure, has been assigned a higher risk-severity level (e.g., an increase from low to moderate, moderate to high, etc.) and/or the like.

At decision block 306, the management server 120 determines whether a notification is required based, at least in part, on the rules engine 122. If so, notification is performed in accordance with the rules of the rules engine 122. For example, one or more of the alerts 134 and/or the reports 132 may be presented on the monitoring console 130. By way of further example, messages may be sent to individuals specified by the rules of the rules engine 122. The messages can be, for example, email messages, text messages, instant messages, automated voice communications, and/or the like. If it is determined at the decision block 306, that no notification should be performed, the process 300 proceeds to block 310 where no notification is performed in accordance with the determination.

Although various embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth herein.

What is claimed is:

1. A method comprising, by a computer system comprising a processing unit, wherein the processing unit is operable to implement the method:
    monitoring, by a file-system auditing component comprising a computer server, file-system events of a file system for risk-assessment events;
    responsive to a real-time determination of at least one risk-assessment event:
        determining an age of a file-system object associated with the risk-assessment event, wherein the age comprises at least one of a creation date of the file-system object and a time elapsed since the creation date;
        counting a number of individual users who have permission to access the file-system object;
        measuring a depth of the file-system object in the file system;
        determining, by an exposure-assessment module comprising a computer server, a content-independent risk of exposure of the file-system object;
        wherein the content-independent risk of exposure is determined as a function of at least the determined age, the counted number of individual users and the measured depth;
        wherein the content-independent risk of exposure increases in response to a greater determined age of the file-system object, a greater counted number of individual users who have permission to access the file-system object, and lesser values of the measured depth of the file-system object; and
        wherein the determining the content-independent risk of exposure is performed without scanning data within the file system for sensitive information.

2. The method of claim 1, comprising:
    evaluating the determined content-independent risk of exposure against one or more notification rules; and
    responsive to a notification determination, notifying one or more users of the determined content-independent risk of exposure.

3. The method of claim 1, wherein the at least one risk-assessment event is selected from the group consisting of: a permissions change, a read access, and a write access.

4. The method of claim 1, wherein the file-system object comprises a plurality of files.

5. The method of claim 1, wherein the file-system object comprises a folder.

6. The method of claim 1, wherein the determining of the content-independent risk of exposure is based, at least in part, on a user-access count and a group-access count.

7. The method of claim 1, wherein the determining of the content-independent risk of exposure is based, at least in part, on file-system-object variables selected from the group consisting of: age of permissions, number of write accesses, number of read accesses, number of changes to user permissions over a certain period of time, number of changes to user-group permissions over a certain period of time, number of file-creation events, number of explicit individual-user accesses, and number of group accesses.

8. An information handling system comprising:
    a computing device comprising a processor, wherein the processor is operable to implement a method, the method comprising:
        monitoring, by a file-system auditing component comprising a computer server, file-system events of a file system for risk-assessment events;
        responsive to a real-time determination of at least one risk-assessment event:
            determining an age of a file-system object associated with the risk-assessment event, wherein the age comprises at least one of a creation date of the file-system object and a time elapsed since the creation date;
            counting a number of individual users who have permission to access the file-system object;
            measuring a depth of the file-system object in the file system;
            determining, by an exposure-assessment module comprising a computer server, a content-independent risk of exposure of the file-system object;
            wherein the content-independent risk of exposure is determined as a function of at least the determined age, the counted number of individual users and the measured depth;
            wherein the content-independent risk of exposure increases in response to a greater determined age of the file-system object, a greater counted number of individual users who have permission to access the file-system object, and lesser values of the measured depth of the file-system object; and
            wherein the determining the content-independent risk of exposure is performed without scanning data within the file system for sensitive information.

9. The information handling system of claim 8, the method comprising:
    evaluating the determined content-independent risk of exposure against one or more notification rules; and
    responsive to a notification determination, notifying one or more users of the determined content-independent risk of exposure.

10. The information handling system of claim 8, wherein the at least one risk-assessment event is selected from the group consisting of: a permissions change, a read access, and a write access.

11. The information handling system of claim 8, wherein the file-system object comprises a plurality of files.

12. The information handling system of claim 8, wherein the file-system object comprises a folder.

13. The information handling system of claim 8, wherein the determining of the content-independent risk of exposure is based, at least in part, on a user-access count and a group-access count.

14. The information handling system of claim 8, wherein the determining of the content-independent risk of exposure is based, at least in part, on file-system-object variables selected from the group consisting of: age of permissions, number of write accesses, number of read accesses, number of changes to user permissions over a certain period of time, number of changes to user-group permissions over a certain period of time, number of file-creation events, number of explicit individual-user accesses, and number of group accesses.

15. A computer-program product comprising a non-transitory computer-usable medium having computer-readable program code embodied therein, the computer-readable program code adapted to be executed to implement a method comprising:

monitoring, by a file-system auditing component comprising a computer server, file-system events of a file system for risk-assessment events;

responsive to a real-time determination of at least one risk-assessment event:

determining an age of a file-system object associated with the risk-assessment event, wherein the age comprises at least one of a creation date of the file-system object and a time elapsed since the creation date;

counting a number of individual users who have permission to access the file-system object;

measuring a depth of the file-system object in the file system;

determining, by an exposure-assessment module comprising a computer server, a content-independent risk of exposure of the file-system object;

wherein the content-independent risk of exposure is determined as a function of at least the determined age, the counted number of individual users and the measured depth;

wherein the content-independent risk of exposure increases in response to a greater determined age of the file-system object, a greater counted number of individual users who have permission to access the file-system object, and lesser values of the measured depth of the file-system object; and wherein the determining the content-independent risk of exposure is performed without scanning data within the file system for sensitive information.

16. The computer-program product of claim 15, the method comprising:

evaluating the determined content-independent risk of exposure against one or more notification rules; and responsive to a notification determination, notifying one or more users of the determined content-independent risk of exposure.

17. The computer-program product of claim 15, wherein the at least one risk-assessment is selected from the group consisting of: a permissions change, a read access, and a write access.

\* \* \* \* \*